2,930,798
3-ALKANOYL 1-TERTIARY-AMINO-ALKYL INDOL OXIMES AND PRODUCTION THEREOF

Josef Schmitt, l'Hay-les-Roses, France, assignor to Etablissements Clin-Byla (Societe anonyme), Paris, France, a company of France No Drawing. Application July 17, 1958
Serial No. 749,074

Claims priority, application France August 3, 1956

6 Claims. (Cl. 260—319)

This application is a continuation-in-part of my application Serial No. 674,298, now abandoned.

In my copending U.S. patent application Serial No. 575,005, filed March 30, 1956, I have described certain N-tertiary-amino-alkyl phenothiazines having an acyl group or oxo-alkyl in the 3-position of the phenothiazine nucleus, and the production thereof by decarboxylating N-tertiary-amino alkyl esters of the corresponding phenothiazine N-carboxylic acids. In my copending U.S. patent application Serial No. 663,916, filed June 6, 1957, and now abandoned, I have described another process for producing the same and related compounds; according to that process an acyl phenothiazine, in particular a 3-acyl phenothiazine, is condensed with a tertiary-amino alkyl halide with or without transitory blocking of the oxo-group in the acyl side chain.

I have now found that other heterocyclic compounds having an acyl substituent attached to the nucleus and a nuclear nitrogen atom which bears a tertiary-amino alkyl chain are also highly desirable for therapeutic purposes or as intermediate products for the production of compounds useful for therapeutic purposes.

Broadly stated my invention comprises basic derivatives of pyrrol and benzo pyrrols which bear a tertiary-amino alkyl chain attached to the nuclear nitrogen atom and an acyl (oxo-alkyl or oxo-phenyl-alkyl) group attached to a nuclear carbon atom, their acid addition salts, their quaternary ammonium derivatives and the corresponding oximes.

More particularly, my invention comprises pyrrol, indol (or benzo pyrrol) and carbazol (or dibenzo pyrrol) derivatives having the characteristics above indicated and bearing an acyl (oxo-alkyl or oxo-phenyl-alkyl) group in any position, more particularly in the 2 (or α)-position, the 3-position and the 2-position respectively, and also their acid addition salts, their quaternary ammonium derivatives and the corresponding oximes.

As example, I shall mention 2-propionyl 1-α-dimethylamino-propyl pyrrol and the methiodide thereof, 3-propionyl 1-α-dimethylamino-propyl indol, the methiodide and the acid maleate thereof and the corresponding oxime, 3-formyl 1-β-dimethylamino-ethyl indol and the acid maleate thereof and the corresponding oxime, 3-acetyl 1-β-dimethylamino-ethyl indol and the acid maleate thereof, the corresponding oxime and the acid maleate of said oxime, 3-n-propionyl 1-β-dimethylamino-ethyl indol, the methiodide and the acid maleate thereof, the corresponding oxime and the acid maleate of said oxime, 3-n-butyryl 1-β-dimethylamino-ethyl indol and the acid maleate thereof, the corresponding oxime and the acid maleate of said oxime, 3-valeroyl 1-β-dimethylamino-ethyl indol and the acid maleate thereof, the corresponding oxime and the acid maleate of said oxime, 3-phenylacetyl 1-β-dimethylamino-ethyl indol and the acid maleate thereof and the corresponding oxime, propionyl 1-β-diethylamino-ethyl indol and the acid maleate thereof, 3-propionyl 1-(β-methyl-β-dimethylamino)-ethyl indol and the acid maleate thereof, the corresponding oxime, 2-propionyl 9-(γ-dimethylamino)-propyl carbazol and the hydrochloride and the methiodide thereof, the corresponding oxime, 2-propionyl 9-(β-dimethylamino)-ethyl carbazol and the hydrochloride and the methiodide thereof, the corresponding oxime, 2-propionyl 9-(β-methyl-β-dimethylamino)-ethyl carbazol, the hydrochloride and the methiodide thereof, and the corresponding oxime. The foregoing list is not limiting.

The above listed compounds are useful for therapeutic purposes or as intermediate products in the manufacture of therapeutically useful compounds.

Among the compounds provided according to this invention, particularly desirable are the oximes of the general formula

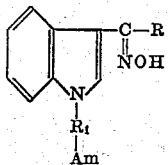

wherein R is selected from the class consisting of H, $CH_3$, $C_2H_5$, $C_3H_7$, $C_4H_9$ and

$R_1$ is an alkylene group having 2 or 3 carbon atoms and Am is selected from the class consisting of dimethylamino, diethylamino, morpholino, pyrrolidino, piperidino, piperazino, and N'-methyl piperazino groups especially those in which R is H or an alkyl group having from 1 to 4 carbon atoms while Am is dimethylamino or diethylamino.

As a matter of fact, particularly desirable for therapeutic purposes as vasoconstrictive agents are the oximes corresponding to 3-formyl, 3-acetyl, 3-n-propionyl, 3-n-butyryl and 3-n-valeroyl 1-β-dimethylamino-ethyl indol, more particularly to 3-acetyl, 3-n-propionyl and 3-n-butyryl 1-β-dimethylamino-ethyl indol, and the acid addition salts thereof with pharmaceutically acceptable acids.

While acid maleates of such oximes are particularly convenient in being easily produced in crystalline form and being readily soluble in water, other acid addition salts with pharmaceutically acceptable acids, for example hydrochloric acid, phosphoric acid, sulphuric acid, oxalic acid, fumaric acid, succinic acid, citric acid, tartaric acid, gluconic acid may also be employed.

My invention further comprises a process for the production of basic derivatives of pyrrol and benzo pyrrols defined as above, wherein an acyl pyrrol or acyl benzo pyrrol is condensed with a tertiary-amino alkyl halide, preferably in an inert organic medium in the presence of an alkaline condensation agent. The reaction proceeds with a very good yield where the acyl group contains 3 or more carbon atoms and a less good yield where the acyl group contains less than 3 carbon atoms.

As a tertiary-amino alkyl halide, the more readily available, viz. the chloride, is preferred.

The condensation is preferably effected in an anhydrous organic medium. An aromatic hydrocarbon, in most cases toluene on account of the level of the boiling point thereof, or an ether may be employed and the condensation is then generally effected at reflux temperature, if desired under an inert gas, e.g. nitrogen, atmosphere.

However I have found that it is particularly desirable to effect condensation in a dialkyl-formamide especially dimethyl formamide. With such a medium, it is possible to work at a lower temperature than with say toluene and also to obtain better yields. Dimethyl formamide was found particularly desirable where a tertiary-amino alkyl halide such as 1-dimethylamino 2-chloro propane is employed, a transposition of the tertiary amino group taking place in the course of the reaction.

The preferred alkaline condensation agent is sodium amide but metallic sodium, or, as the case may be, another alkali metal, in particular as the metal or as a hydride or mixed hydride, hydroxide or carbonate may also be employed.

The basic derivative thus obtained may then be converted to an acid addition salt or an oxime or a quaternary ammonium compound according to any conventional method.

The following examples which are not limiting will illustrate the invention.

EXAMPLE 1

(a) *2-propionyl 1-γ-dimethylamino-propyl pyrrol*

In a 500 ml. three-neck flask provided with a central stirring device and a reflux cooler, 12.3 g. of 2-propionyl pyrrol dissolved in 150 ml. of toluene were placed together with 5 g. of sodium amide under a nitrogen atmosphere. The mixture was boiled for two hours then after reducing the supply of heat, 15 g. of 1-chloro 3-dimethylamino propane were added at one go. The mixture was again refluxed for two hours.

After cooling, water was added and the toluene layer decanted. Filtering was necessary to remove solid impurities. After a new washing with water, several extractions with a 10 percent aqueous solution of acetic acid were effected to extract the desired base from the toluene layer. The extracts were combined and the base was liberated therefrom by adding sodium hydroxide solution then extracted by means of ether. After driving off ether, the extract was distilled under a pressure of 15 mm. of mercury, yielding 13.5 g. of a colourless, strongly smelling oil which distilled at 210° C. (temperature of the heating bath).

(b) *Methiodide of base (a)*

In an Erlenmeyer flask, 2 g. of base (a) dissolved in anhydrous ethanol were placed together with 3 ml. of methyl iodide. The methiodide thus formed remained dissolved; after 24 hours, the methiodide was precipitated as an oil by adding anhydrous ethyl ether, and gradually crystallized. It was recrystallized from a mixture of methyl alcohol and ether; 2.8 g. of crystallized methiodide were obtained as small white leaflets melting at 141–142° C.

EXAMPLE 2

(a) *3-propionyl 1-γ-dimethylamino-propyl indol*

A suspension of 26 g. of 3-propionyl indol and 7.1 g. of sodium amide in 200 ml. of xylene was refluxed for 2 hours with stirring, under a nitrogen or hydrogen stream. The sodium compound of 3-propionyl indol gradually precipitated; 25 g. of 1-chloro 3-dimethylamino propane in 50 ml. of xylene were then added and boiling was again proceeded with for 1½ hours, after which only a slight precipitate remained in the solution.

The reaction mixture was washed with water, a slight undissolved precipitate was filtered off, washing water was discarded and the xylene solution was treated with a mixture of 30 ml. of acetic acid and 60 ml. of water, and finally with water slightly acidified with acetic acid. The aqueous solutions were combined and made alkaline with sodium hydroxide, and the oily base was extracted with ether. The ethereal solution was washed with water and dried over sodium sulphate, the solvent evaporated and the residue distilled in a retort. Between 185 and 205° C. (heating bath temperature) under 1 mm. of mercury, 26 g. of a yellow oil were collected. There was no head fraction and only a very slight residue was found in the retort.

(b) *Acid maleate of base (a)*

To a solution of 6.5 g. of the oil obtained as described under (a) in 30 ml. of ethyl acetate, a solution of 3 g. of maleic acid in the same solvent was added, and the mixture was boiled for a few minutes. An oil precipitated and set to crystals on the water-bath. After cooling, white crystals as produced were washed with ethyl acetate and anhydrous ether; 8.1 g. thereof were obtained; melting point 142° C.

Recrystallized from isopropanol, the acid maleate was obtained as small colourless scales melting at 142° C.

(c) *Oxime of base (a)*

To 6.5 g. of 3-propionyl 1-γ-dimethylamino-propyl indol, a solution of 3.5 g. of hydroxylamine hydrochloride in 500 ml. of water was added. A clear solution was obtained; it was heated to reflux for 1 hour. It was then made alkaline with caustic soda lye, whereupon a pasty precipitate was produced. The whole was heated on a water-bath for 30 minutes then cooled under a water stream, the aqueous layer decanted, and the remainder washed by decantation with water, and crystallized from aqueous ethyl alcohol then from methanol. Colourless prisms (2.9 g.) melting at 135–137° C. were obtained.

(d) *Methiodide of base (a)*

To a solution of 3.5 g. of 3-propionyl 1-γ-dimethylamino-propyl indol in 20 ml. of absolute ethyl alcohol, 4 g. of methyl iodide were added. A crystallized substance gradually formed and was recrystallized from absolute ethyl alcohol. Small transparent, pale yellow plates (3.4 g.) having a melting point of 189° C. were finally obtained.

EXAMPLE 3

Starting from 1-chloro 2-dimethylamino ethane instead of 1-chloro 3-dimethylamino propane and working in a manner analogous to that described from (a) to (d) in Example 2, the following compounds were prepared successively:

(a) 3-propionyl 1-β-dimethylamino-ethyl indol, a yellow oil which distilled at 200–210° C. (heating bath temperature) under 1 mm. of mercury;

(b) The acid maleate of base (a), which recrystallized from isopropanol gave light yellow leaflets melting at 150° C.;

(c) The oxime of base (a), which recrystallized from methanol gave small colourless crystals melting at 145° C.;

(d) The methiodide of base (a), which recrystallized from methanol gave pale yellow prisms melting at 225–226° C.

EXAMPLE 4

Starting from 2-chloro 1-dimethylamino propane instead of 1-chloro 3-dimethylamino propane and working in manner analogous to that described under (a) and (b) in Example 2, the following compounds were prepared successively:

(a) 3-propionyl 1-β-methyl-β-dimethylamino-ethyl indol, a light yellow oil which distilled at 200–205° C. (heating bath temperature) under 1 mm. of mercury;

(b) The acid maleate of base (a), which recrystallized from isopropyl alcohol gave big colourless crystals melting at 93° C.

EXAMPLE 5

Working in a manner analogous to that described in Example 2 but initially substituting 2-propionyl carbazol for 1-propionyl indol, the following compounds were prepared successively:

(a) 2-propionyl 9-γ-dimethylamino-propyl carbazol, a light yellow oil which crystallized gradually and recrystallized from petroleum ether gave light yellow crystals melting at 62–63° C.;

(b) The hydrochloride of base (a) which recrystallized from water gave pale yellow leaflets melting at 239° C.;

(c) The oxime of base (a) which recrystallized from ethanol gave colourless prisms melting at 168° C.;

(d) The methiodide of base (a) which recrystallized from ethanol gave fine colourless needles melting at 232° C.

EXAMPLE 6

Working in accordance with Example 5 from 2-propionyl carbazol and 1-chloro 2-dimethylamino ethane the following compounds were prepared successively:

(a) 2-propionyl 9-β-dimethylamino-ethyl carbazol which recrystallized from isopropyl alcohol gave fine, light yellow crystals melting at 94–95° C.;

(b) The hydrochloride of base (a) which recrystallized from isopropyl alcohol gave fine colourless crystals melting at 257° C.;

(c) The oxime of base (a) which recrystallized from isopropyl alcohol gave fine white needles melting at 157–158° C.;

(d) The methiodide of base (a) which recrystallized from methyl alcohol gave small, light yellow prisms melting at 244–245° C.

EXAMPLE 7

Working in accordance with Example 5 from 2-propionyl carbazol and 2-chloro 1-dimethylamino propane, the following compounds were prepared successively:

(a) 2-propionyl 9-β-methyl-β-dimethylaminoethyl carbazol which recrystallized from a mixture of ethyl ether and petroleum ether gave big light yellow crystals melting at 70° C.;

(b) The hydrochloride of base (a), which recrystallized from a mixture of isopropyl alcohol and isopropyl ether gave a crystalline powder melting at 190° C.;

(c) The oxime of base (a), which recrystallized from ethyl alcohol gave fine transparent needles melting at 175–176° C.;

(d) The methiodide of base (a), which recrystallized from ethanol gave small, pale yellow crystals melting at 234–235° C.

EXAMPLE 8

(a) 3-acetyl 1-β-dimethylamino-ethyl indol

Starting from 3-acetyl indol (melting point 188–190° C.) prepared according to Oddo's method, 12 g. thereof were dissolved in 40 ml. of anhydrous dimethylformamide and 3.5 g. of sodium amide were stirred into the mixture; after a few minutes, the mixture was gradually heated to 70° C. on a water-bath and the temperature was maintained at that level for 30 minutes. Thereafter 10 g. of 1-dimethylamino 2-chloro ethane were introduced into the mixture which was still maintained for 2 hours at 70° C. The mixture was evaporated to dryness in vacuo on a water-bath and treated with water; the base was extracted therefrom with ethyl acetate.

The extract was then extracted with dilute acetic acid for recovering the base contained therein, the aqueous layer was decanted and made alkaline with caustic soda lye; the base thus set free was finally extracted with ethyl acetate. The extract was washed with water, it was dried over sodium sulphate, the solvent was evaporated therefrom, and the residue was distilled in a retort. At 185–205° C. (heating bath temperature) under 0.5 mm. of mercury, 13.1 g. of an oil were obtained and employed without purification for the next step.

(b) Acid maleate of compound (a)

The 13.1 g. of crude base were treated with 7.3 g. of maleic acid in ethyl acetate. Colourless crystals (17 g.) were collected and recrystallized from absolute ethyl alcohol. Colourless needles melting at 162° C. were obtained.

For analysis purposes, a sample thereof was recrystallized from 95 percent ethyl alcohol. The melting point was unaltered.

|  | C, Percent | H, Percent | N, Percent |
|---|---|---|---|
| Calculated for $C_{14}H_{18}N_2O \cdot C_4H_4O_4$ | 62.41 | 6.40 | 8.09 |
| Found | 62.51 | 6.52 | 8.17 |
|  | 62.47 | 6.59 | 8.11 |

(c) Oxime corresponding to compound (a)

A mixture of 10.9 g. of the acid maleate (b), 7.5 g. of hydroxylamine hydrochloride, 30 g. of potassium hydroxide, 150 ml. of 95 percent ethyl alcohol and 75 ml. of water (colourless solution) was heated for 4 hours on a water-bath. The reaction mixture was then diluted with much water; a pasty precipitate was formed; it was washed by decantation with water and then crystallized from dilute (about 50 percent) ethyl alcohol. White scales (4.4 g.) melting at 136° C. were collected and recrystallized from methanol for analysis; the melting point did not change.

|  | C, Percent | H, Percent | N, Percent |
|---|---|---|---|
| Calculated for $C_{14}H_{19}N_3O$ | 68.55 | 7.81 | 17.13 |
| Found | 68.87 | 8.10 | 16.98 |
|  | 69.09 | 7.76 | 17.15 |

EXAMPLE 9

Following the procedure of Example 8 but substituting 3-phenylacetyl indol (prepared according to Oddo's method: white crystals melting at 207° C.) for 3-acetyl indol, the following compounds were obtained successively:

(a) 3-phenylacetyl 1-β-dimethylamino-ethyl indol, an oil which distilled at 220–240° C. (heating bath temperature) under 0.5 mm. of mercury and gave bright, pale yellow crystals melting at 93° C. after crystallization from cyclohexane (and also after a subsequent recrystallization from isopropanol).

|  | C, Percent | H, Percent | N, Percent |
|---|---|---|---|
| Calculated for $C_{22}H_{22}N_2O$ | 78.29 | 7.23 | 9.14 |
| Found | 79.07 | 7.38 | 9.08 |
|  | 78.93 | 7.48 | 9.12 |

(b) Acid maleate of compound (a), which recrystallized from anhydrous ethanol had a melting point of 148–149° C. (matted, bright crystals).

|  | C, Percent | H, Percent | N, Percent |
|---|---|---|---|
| Calculated for $C_{24}H_{26}N_2O$ | 68.22 | 6.20 | 6.63 |
| Found | 67.97 | 6.22 | 6.62 |
|  | 68.15 | 6.27 | 6.63 |

(c) Oxime corresponding to compound (a), bright leaflets melting at 204° C. after recrystallization from ethyl acetate.

|  | C, Percent | H, Percent | N, Percent |
|---|---|---|---|
| Calculated for $C_{20}H_{23}N_3O$ (sample dried at 100° C.) | 74.73 | 7.21 | 13.07 |
| Found | 74.89 | 7.24 | 12.99 |
|  | 74.70 | 7.39 | 12.96 |

EXAMPLE 10

Following the procedure of Example 8 but substituting 3-propionyl indol for 3-acetyl indol and 1-diethylamino 2-chloro ethane for 1-dimethylamino-chloro ethane, the following compounds were prepared successively:

(a) 3-propionyl 1-β-diethylamino ethyl indol, a yellow oil distilling at 200–220° C. (heating bath temperature) under a pressure of 0.4 mm. of mercury;

(b) Acid maleate of compound (a), colourless prisms melting at 189° C. after recrystallization from isopropanol. For analysis, a sample was dried at 80° C. under 1 mm. of mercury.

|  | C, Percent | H, Percent |
|---|---|---|
| Calculated for $C_{17}H_{24}N_2O.C_4H_4O_4$ | 64.92 | 7.26 |
| Found | 64.81 | 7.49 |
|  | 64.77 | 7.42 |

(c) Oxime corresponding to compound (a), colourless scales melting at 136° C. after recrystallization from 95 percent ethyl alcohol. For analysis, a sample was dried at 80° under 1 mm. of mercury.

|  | C, Percent | H, Percent |
|---|---|---|
| Calculated for $C_{17}N_{24}N_2O$ | 71.29 | 8.45 |
| Found | 71.18 | 9.01 |
|  | 71.37 | 8.98 |

EXAMPLE 11

The present example illustrates the production in the presence of dimethylformamide, of 3-propionyl 1-β-methyl-β-dimethylamino-ethyl indol acid maleate (the production of which in the presence of toluene is described above in Example 4) and the oxime corresponding to the base.

(a) *3-propionyl 1-β-methyl-β-dimethylamino-ethyl indol and acid maleate thereof*

Into an ice-cooled solution of 13 g. of 3-propionyl indol in 40 ml. of anhydrous dimethyl formamide, 3.5 g. of sodium amide were stirred. The ice cooling bath was then withdrawn and the mixture allowed to come back to ambient temperature, after which 2.9 g. of 1-dimethylamino 2-chloro propane were dropped into the mixture. The mixture was then heated to 40–45° C., while stirring, for 24 hours.

The heating period indicated was found to correspond to the best conversion rate but as a matter of fact the desired product could also be obtained by heating for a shorter period, for example 4 hours, and subsequently recovering unreacted starting material.

The reaction mixture was then evaporated to dryness in vacuo to drive off dimethylformamide, treated with water then extracted with ethyl acetate, and further treatment was effected as described in Example 8(a).

By distilling in a retort the desired base was obtained with a yield of 75% as a light yellow oil distilling at 190–200° C. (heating bath temperature) under 0.5 mm. of mercury. By treating the crude base thus obtained with maleic acid in ethyl acetate, colourless crystals of acid maleate melting at 94–95° C. were obtained with a yield of 90 percent. A mixture thereof with crystals obtained from the production of the base in toluene medium showed no depression of the melting point.

(b) *3-propionyl 1-β-methyl-β-dimethylamino-ethyl indol oxime*

A mixture of 5.5 g. of the acid maleate (a), 5.5 g. of hydroxylamine hydrochloride, 22 g. of potassium hydroxide, 100 ml. of 95 percent ethyl alcohol and 80 ml. of water was boiled for 5 minutes. Thereafter the major part of alcohol was evaporated and the residue poured into a big volume of water. A thick paste sticking to the vessel wall was obtained; it was washed by decantation several times with water. Upon crystallization from 50 percent ethyl alcohol, small colourless needles (2.6 g.) melting at 162° (Kofler) were obtained.

For analysis, a sample recrystallized from methanol (M.P. 164°, Kofler) was dried at 80° C. under 1 mm. of mercury.

|  | C, Percent | H, Percent |
|---|---|---|
| Calculated for $C_{16}H_{23}N_3$ | 70.33 | 8.47 |
| Found | 70.33 | 8.73 |
|  | 70.20 | 8.65 |

EXAMPLE 12

*3-formyl 1-β-dimethylamino-ethyl indol and acid maleate thereof*

A mixture of 3-formyl indol (12.9 g.), 1-chloro 2-dimethylamino ethane (11.4 g.), powdered sodium amide (6 g.) and dimethyl formamide (150 ml.) was stirred for 24 hours at 40° C. The solid residue was filtered off and the subsequent procedure was the same as will be described subsequently in Example 17.

3-formyl 1-β-dimethylamino-ethyl indol was obtained as an oil boiling at 160° C. under a pressure of 0.4 mm. (temperature of the heating bath), and the acid maleate thereof, after recrystallization from isopropanol, had a melting point of 127° C. The yield (reckoned on 3-formyl indol) of said acid maleate amounted to 69 percent.

Results of the analysis (acid maleate):

|  | C, Percent | H, Percent | N, Percent |
|---|---|---|---|
| Calculated for $C_{17}H_{20}N_2O_5$ | 61.42 | 6.06 | 8.43 |
| Found | 61.54 | 6.19 | 8.54 |
|  | 61.67 | 6.01 | 8.38 |

The starting material, 3-formyl indol was prepared according to Tyson, J. Am. Chem. Soc., 1952, 74, 2274.

EXAMPLE 13

*3-formyl 1-β-dimethylamino-ethyl indol oxime*

A solution of 3-formyl 1-β-dimethylamino-ethyl indol acid maleate (9.9 g.) prepared according to Example 12, hydroxylamine hydrochloride (7.5 g.) and crystallized sodium acetate (22 g.) in water (40 ml.) and ethanol (30 ml.) was boiled for an hour. The light yellow solution thus obtained was diluted with about one volume of water, acidified with acetic acid, and an aqueous solution of sodium carbonate was added thereto for precipitating the desired oxime. The oxime was filtered off and recrystallized from 70 percent (by volume) ethyl alcohol. The melting point was 175° C., the yield 40%.

| Analysis | C, percent | H, percent | N, percent |
|---|---|---|---|
| Calculated for $C_{13}H_{17}N_3O$ | 67.50 | 7.41 | 18.17 |
| Found | 67.52 | 7.52 | 17.88 |
|  | 67.53 | 7.59 | 17.99 |

EXAMPLE 14

*Acid maleate of 3-acetyl 1-β-dimethylamino-ethyl indol oxime*

A solution in ethyl acetate of 3-acetyl 1-β-dimethylamino-ethyl indol oxime (2.1 g.) prepared according to Example 8(c) was admixed with a solution of maleic acid (1.1 g.) in ethyl acetate. An oily precipitate which quickly crystallized was produced. It was filtered off and after recrystallization from absolute ethanol yielded amber-like crystals (2.4 g.) having a melting point of 161° C. (dec.)

| Analysis | C, percent | H, percent | N, percent |
|---|---|---|---|
| Calculated for $C_{18}H_{23}N_3O_5$ | 59.82 | 6.41 | 11.03 |
| Found | 59.57 | 6.58 | 11.65 |
|  | 59.91 | 6.55 | 11.09 |

EXAMPLE 15

Acid maleate of 3-propionyl 1-β-dimethylamino-ethyl indol oxime

A solution of the oxime (15 g.) prepared in accordance with Example 3(c), in ethyl acetate (100 ml.) was combined with a solution of maleic acid (7.4 g.) in ethyl acetate (100 ml.) at a temperature in the neighborhood of the boiling point of ethyl acetate. A substance crystallized out almost immediately; it was separated and recrystallized from 95 percent ethyl alcohol. Fine crystals (19.8 g.) having a melting point of 161° C. (dec.) were obtained.

| Analysis | C, percent | H, percent | N, percent |
|---|---|---|---|
| Calculated for $C_{19}H_{25}N_3O_5$ | 60.79 | 6.71 | 11.20 |
| Found | 60.68 | 6.95 | 11.11 |
|  | 60.84 | 6.84 | 11.09 |

EXAMPLE 16

(a) *3-butyryl 1-β-dimethylamino-ethyl indol oxime*

A solution of the acid maleate (14 g.) of 3-butyryl 1-β-dimethylamino-ethyl indol, hydroxylamine hydrochloride (15 g.), potassium hydroxide (40 g.), water (160 ml.) and ethyl alcohol (200 ml.) was boiled for 3 hours. The major portion of alcohol was then driven off in vacuum on a water bath and the residue poured into water; a pasty product was precipitated and crystallized in a few minutes. It was filtered off and recrystallized from 70 percent ethyl alcohol. Needle shaped crystals (6.5 g.) having a melting point of 116° C. were obtained.

| Analysis | C, percent | H, percent | N, percent |
|---|---|---|---|
| Calculated for $C_{16}H_{23}N_3O$ | 70.29 | 8.48 | 15.37 |
| Found | 70.41 | 8.70 | 15.30 |
|  | 70.15 | 8.63 | 15.31 |

(b) *Acid maleate of base (a)*

A solution of base (a) (4.0 g.) in ethyl acetate and a solution of maleic acid (1.8 g.) in ethyl acetate were combined at a temperature in the neighbourhood of the boiling point of ethyl acetate. An oily product precipitated and quickly crystallized on cooling. It was filtered off and recrystallized from absolute ethanol. White crystals (4.8 g.) having a melting point of 160° C. (dec.) were obtained.

| Analysis | C, percent | H, percent | N, percent |
|---|---|---|---|
| Calculated for $C_{20}H_{27}N_3O_5$ | 61.67 | 6.99 | 10.79 |
| Found | 61.57 | 7.19 | 10.76 |
|  | 61.84 | 7.35 | 10.75 |

The starting material 3-butyryl 1-β-dimethylamino-ethyl indol was prepared by same procedure as will be described below in Example 17, from 3-butyryl indol (M.P. 175° C.; xylene) produced according to Oddo's synthesis. The acid maleate of 3-butyryl 1-β-dimethylamino-ethyl indol was found to have a melting point of 140° C., the results of analysis in respect thereof being as follows:

| Analysis | C, percent | H, percent | N, percent |
|---|---|---|---|
| Calculated for $C_{20}H_{25}N_2O_5$ | 64.14 | 7.00 | 7.48 |
| Found | 64.32 | 6.96 | 7.49 |
|  | 64.03 | 7.04 | 7.59 |

EXAMPLE 17

3-valeroyl 1-β-dimethylamino-ethyl indol and acid maleate thereof

Powdered sodium amide (10 g.) was added while stirring and with moisture excluded, to a solution of 3-valeroyl indol (30.2 g.) in anhydrous dimethyl formamide (100 ml.). The inner temperature was limited to 60° C. by means of a cool water bath then after cooling to room temperatures 1-chloro 2-dimethylamino ethane (19.5) was added. The mixture was left to room temperature for 30 minutes then heated to 65–70° C. for 2 hours. The solid residue was filtered off, dimethyl formamide was evaporated in vacuum on a water-bath, the residue taken up in ethyl acetate and water, the organic phase extracted with dilute acetic acid, and the base set free from the aqueous phase by adding caustic soda lye thereto.

The base was extracted with ethyl acetate, the extract washed with water, dried over sodium sulphate and distilled after evaporation of ethyl acetate. At a temperature of 190–210° C. under 0.4 mm. of mercury (heating bath temperature), an oil (30.5 g.) was obtained.

A hot solution thereof in ethyl acetate was admixed with a hot solution of maleic acid (14 g.) in the same solvent. White crystals separated out and were recrystallized from 95 percent ethyl alcohol. The final crystals of acid maleate (39.6 g.) had a melting point of 156–157°.

| Analysis (acid maleate) | C, percent | H, percent | N, percent |
|---|---|---|---|
| Calculated for $C_{21}H_{28}N_2O_5$ | 64.92 | 7.27 | 7.21 |
| Found | 65.06 | 7.28 | 7.54 |
|  | 64.97 | 7.32 | 7.48 |

The starting material, 3-valeroyl indol, was prepared according to Oddo's synthesis.

EXAMPLE 18

(a) *3-valeroyl 1-β-dimethylamino-ethyl indol oxime*

The technique was the same as in Example 16, the starting materials being acid maleate (19.4 g.) of 3-valeroyl 1-β-dimethylamino-ethyl indol, hydroxylamine hydrochloride (20 g.), potassium hydroxide (50 g.), water (200 ml.) and ethyl alcohol (240 g.). The final base was recrystallized from 50 percent ethyl alcohol. Bright crystals (8.2 g.) having a melting point of 107–108° C. were obtained.

| Analysis | C, percent | H, percent | N, percent |
|---|---|---|---|
| Calculated for $C_{17}H_{25}N_3O$ | 71.04 | 8.77 | 14.62 |
| Found | 70.99 | 8.84 | 14.54 |
|  | 71.19 | 8.80 | 14.59 |

(b) *Acid maleate of base (a)*

Combining a solution of base (a) (5.8 g.) in hot ethyl acetate and a solution of maleic acid (2.3 g.) in hot ethyl acetate as described in Example 16 (b), I obtained a mixture from which white crystals (6.3 g.) having a melting point of 152° C. separated on cooling.

| Analysis | C, percent | H, percent | N, percent |
|---|---|---|---|
| Calculated for $C_{21}H_{29}N_3O_5$ | 62.51 | 7.25 | 10.42 |
| Found | 62.59 | 7.37 | 10.47 |
|  | 62.49 | 7.35 | 10.45 |

EXAMPLE 19

(a) *Acid maleate of 3-butyryl 1-γ-pyrrolidino-propionyl indol*

Sodium amide (3.5 g.) was introduced while stirring, at a temperature below 30° C., into a solution of 3- butyryl indol (11.2 g.) in dimethylformamide; the dispersion thus produced was heated to 60° C. for 15 minutes then cooled to 20° C., and 1-chloro 3-pyrrolidino propane (9.25 g.) was added thereto. The mixture was stirred at room temperature for 30 minutes then at 65-70° C. for 2 hours.

After working up as described in Example 17, the base was distilled, yielding at a temperature of 180-200° C. under 0.1 mm. of mercury (heating bath temperature) a light yellow oil (15 g.) which was treated with maleic acid (6.1 g.) dissolved in the same amount of isopropyl alcohol. Big bright colourless crystals (15.4 g.) having a melting point of 103° C. were obtained on cooling.

| Analysis | C, percent | H, percent | N, percent |
|---|---|---|---|
| Calculated for $C_{19}H_{26}N_2O.C_4H_4O_4$ | 66.64 | 7.30 | 6.76 |
| Found | 66.89 | 7.42 | 6.88 |
|  | 67.03 | 7.36 | 6.85 |

(b) *Oxime corresponding to base (a)*

Acid maleate of 3-butyryl 1-γ-pyrrolidino-propyl (10 g.), hydroxylamine hydrochloride (10 g.), potassium hydroxide (25 g.), water (100 ml.) and ethyl alcohol (120 ml.) were refluxed together for 3 hours. Towards the end of the heating period the desired oxime, separated as white needles. The suspension was cooled; the crystals (6.8 g.) were filtered off and recrystallized from 95 percent ethyl alcohol. Bright, white leaflets (5.3 g.) having a melting point of 165° C. were obtained.

| Analysis | C, percent | H, percent | N, percent |
|---|---|---|---|
| Calculated for $C_{19}H_{27}N_3O$ | 72.79 | 8.09 | 13.41 |
| Found | 72.87 | 8.59 | 13.56 |
|  | 72.94 | 8.39 | 13.56 |

(c) *Acid maleate of oxime (b)*

The acid maleate was obtained quantitatively from maleic acid (1.2 g.) and the above oxime (3 g.) in ethyl acetate. It was recrystallized from absolute ethanol, yielding colourless prisms; M.P. 148° C.

| Analysis | C, percent | H, percent | N, percent |
|---|---|---|---|
| Calculated for $C_{19}H_{27}N_3O.C_4H_4O_4$ | 64.31 | 7.28 | 9.78 |
| Found | 63.90 | 7.59 | 9.41 |
|  | 63.85 | 7.59 | 9.46 |

(d) *Acid oxalate of oxime (b)*

Produced in absolute ethanol from stoichiometric amounts of the above oxime and oxalic acid, then recrystallized from water, the acid oxalate had a melting point of 191° C.

EXAMPLE 20

(a) *3-propionyl 1-β-morpholino-ethyl indol*

Sodium amide (3.2 g.) was stirred into a solution of 3-propionyl indol (9 g.) in dimethyl formamide (35 ml.) at a temperature below 30° C. and the dispersion was then heated to 60° C. for 15 minutes. It was cooled thereafter to 20° C. then 1-chloro 2-morpholino ethane (8.5 g.) was added thereto and the mixture was stirred for 30 minutes at room temperature then for 2 hours at 65-70° C.

After working up as described in Example 17, the base was distilled at 180-200° C. under 0.1 mm. of mercury (heating bath temperature). A yellow oil (8.6 g.) which solidified on cooling was obtained. A sample thereof crystallized from isopropyl ether gave bright white leaflets having a melting point of 115° C.

| Analysis | C, percent | H, percent | N, percent |
|---|---|---|---|
| Calculated for $C_{17}H_{22}N_2O_2$ | 71.29 | 7.74 | 9.78 |
| Found | 71.40 | 7.82 | 9.83 |
|  | 71.58 | 7.82 | 9.78 |

(b) *Acid maleate of base (a)*

The acid maleate was prepared from base (a) (4 g.) and maleic acid (1.75 g.) in hot ethyl acetate. From the hot solution, an oil precipitated which became crystalline on cooling. The crystals were filtered off and recrystallized from absolute ethanol. Big rose prisms (5 g.) having a melting point of 163° C. were finally obtained.

| Analysis | C, percent | H, percent | N, percent |
|---|---|---|---|
| Calculated for $C_{17}H_{22}N_2O_2.C_4H_4O_4$ | 62.66 | 6.51 | 6.96 |
| Found | 62.58 | 6.67 | 7.04 |
|  | 62.70 | 6.52 | 7.02 |

(c) *Oxime corresponding to base (a)*

3-propionyl 1-β-morpholino-ethyl indol (4 g.), hydroxylamine hydrochloride (5.6 g.), potassium hydroxide (14 g.), water (55 ml.) and ethyl alcohol (70 ml.) were refluxed together for 3 hours. The reaction mixture was made acid with a slight excess of acetic acid, then neutralized with a saturated aqueous solution of sodium carbonate; an oil precipitated and was extracted with ethyl acetate. The solvent was evaporated from the extract and a brown yellow oil (1.7 g.) was obtained.

(d) *Acid maleate of oxime (c)*

The oil obtained according to (c) was reacted with the required amount of maleic acid in hot ethyl acetate. On cooling a brown oil precipitated and crystallized gradually. It was recrystallized twice from absolute ethanol, finally yielding fine cream-coloured crystals; M.P. 152° C.

| Analysis | C, percent | H, percent |
|---|---|---|
| Calculated for $C_{17}H_{23}N_3O_2.C_4H_4O_4$ | 60.41 | 6.52 |
| Found | 60.67 | 6.74 |
|  | 60.48 | 6.61 |

To compounds obtained according to this invention are generally little toxic and act on central nervous system and/or cardio-vascular system.

The pharmacodynamic activity of a few typical compounds will be described below; the compounds in point correspond to the general formula

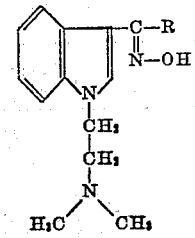

wherein R is H, $CH_3$, $C_2H_5$, n-$C_3H_7$ or n-$C_4H_9$.

In the case of subcutaneous administration to white mice for determining toxicity, the following results were obtained:

| R | Maximum tolerated dose (mg./kg.) | LD 50 (mg./kg.) | LD 100 (mg./kg.) |
|---|---|---|---|
| H | less than 5 mg | 8 | 30. |
| $CH_3$ | 20 | 175 | above 400. |
| $C_2H_5$ | 15 | 75 | above 200. |
| n-$C_3H_7$ | 5 | 50 | Do. |
| n-$C_4H_9$ | above 160 |  |  |

Additionally, the LD 50 was found to be of about 25 mg./kg. as to the second and third compounds when administered intravenously to mice.

The compounds in which R stands for H, CH₃, C₂H₅ or n-C₃H₇ were found, upon intravenous administration to dogs, to produce an increase of arterial blood resulting from a peripheral vasoconstriction.

hypertensive chemicals, hypertensive threshold doses of adrenaline (0.001 mg./kg.) and nor-adrenaline (0.001 mg./kg.), and hypotensive threshold doses of acetylcholine (0.002 mg./kg.) and histamine (0.002 mg./kg.) were administered intravenously to dogs anesthetized with chloralose.

The results are tabulated below:

| R | Adrenaline, 0.001 mg./kg. | nor-adren., 0.001 mg./kg. | Acet. choline, 0.002 mg./kg. | Histamine, 0.002 mg./kg. |
|---|---|---|---|---|
| H | Hypertension extenuated with more than 1 mg./kg. | As with adrenaline | Hypotension stopped with more than 0.1 mg./kg. | Hypotension extenuated with more than 1 mg./kg. |
| CH₃ | Little altered | Little altered | A little extenuated with more than 1 mg./kg. | Lowered with more than 3 mg./kg. |
| C₂H₅ | do | do | Stopped with more than 1-2 mg./kg. | Stopped with more than 10 mg./kg. |
| n-C₃H₇ | do | do | Stopped with more than 0.3-1 mg./kg. | Stopped with more than 0.3 mg./kg. |
| n-C₄H₉ | do | do | Little altered | Little altered. |

Specifically the animals for experiments being dogs anesthetized with chloralose, the arterial blood pressure was measured in the central end of carotid by means of a Ludwig pressure-gauge. The compounds were injected through a cannula placed in the external saphenous vein.

In respect of each compound, the lowest dose capable of causing a slight increase in arterial blood pressure (threshold dose) was measured, then with the dose causing an increase of arterial blood pressure by about 50 percent the time taken for such pressure to come back to its initial level was measured. The results are tabulated below:

| R | Hypertensive threshold dose, mg./kg. | Hypertension by 50 percent | |
|---|---|---|---|
| | | Active dose, mg./kg. | Duration of activity (minutes) |
| H | 0.01 | 0.1 | 10 |
| CH₃ | 0.02-0.1 | 0.1-0.2 | 45-60 |
| C₂H₅ | 0.01 | 0.1 | 45 |
| n-C₃H₇ | 0.005-0.01 | 0.03 | 15 |

Administered orally to chloralosized dogs at a dose of 10 mg./kg., the second compound caused a slight hypertension which lasted about 30 minutes and the third compound a slightly more marked hypertension (+20 percent) which lasted more than 2 hours.

With a view to determining any action of the compounds according to this invention on hypotensive and In other words, the first four compounds interfere but little with the action of adrenaline or nor-adrenaline, but are endowed with atropin-like and antihistaminic properties.

It was further found that the hypertensive action of the second, third and fourth compounds remained in a chloralosized dog after bilateral suprarenalectomy, vegetative ganglial blocking by means of a ganglioplegic agent (hexamethonium) and administration of atropin.

An intensive vasoconstriction was further found in the hindquarters of rabbits receiving any one of said second, third and fourth compounds by perfusion at a constant rate from a Jouvelet's pump.

The therapeutic index may be considered as the ratio between LD 50 (subcutaneous administration to mice) and the dose which administered intravenously causes an increase by 50 percent of dog's arterial blood pressure. The therapeutic indices will then be as follows

| R | Therapeutic index |
|---|---|
| H | 80 |
| CH₃ | 875 |
| C₂H₅ | 750 |
| n-C₃H₇ | 1,666 |

In the following table are summarized the properties useful for therapeutic purposes, of typical oximes of the general formula

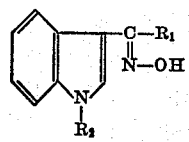

| R₁ | R₂ | Uses |
|---|---|---|
| —H | —CH₂—CH₂—N(CH₃)₂ | Hypertensive agent. |
| —CH₃ | —CH₂—CH₂—N(CH₃)₂ | Local vasoconstrictive agent. |
| —CH₂—CH₃ | —CH₂—CH₂—N(CH₃)₂ | Do. |
| —CH₂—CH₂—CH₃ | —CH₂—CH₂—N(CH₃)₂ | Do. |
| —CH₂—CH₂—CH₂—CH₃ | —CH₂—CH₂—N(CH₃)₂ | Sedative agent for central nervous system. |
| —CH₂—⟨ ⟩ | —CH₂—CH₂—N(CH₃)₂ | Depressive agent for cardio vascular system. |
| —CH₂.CH₃ | —CH₂—CH—N(CH₃)₂<br>         \|<br>         CH₃ | Hypertensive agent. |
| —CH₂.CH₃ | —CH₂—CH₂—CH₂—N(CH₃)₂ | Depressive agent for central nervous system. |

The oximes produced according to this invention may be employed as such or as acid addition salts thereof in local applications (nasal instillations, sprays, aerosols, collyriums) or in general applications (as solutions in aqueous solvents or organic solvents such as oils or ethylene glycol, for intramuscular or intravenous administration).

What I claim is:

1. A member selected from the class consisting of oximes and acid addition salts of said oximes with pharmaceutically acceptable acids, said oximes having the general formula

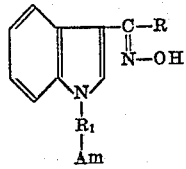

wherein R is a group selected from the class consisting of

H, —$CH_3$, —$CH_2$—$CH_3$, —$CH_2$—$CH_2$—$CH_3$,

—$CH_2$—$CH_2$—$CH_2$—$CH_3$ and

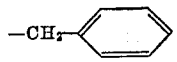

$R_1$ is an alkylene group having two to three carbon atoms and Am is selected from the class consisting of dimethylamino, diethylamino, morpholino and pyrrolidino, said acids being selected from the class consisting of hydrochloric, phosphoric, sulphuric, oxalic, maleic, fumaric, succinic, citric, tartaric and gluconic acids.

2. 3-propionyl 1-β-dimethylamino ethyl indol oxime of the formula

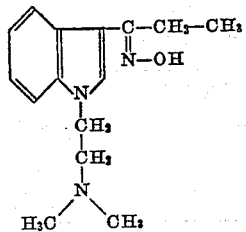

3. 3-acetyl 1-β-dimethylamino-ethyl indol oxime of the formula

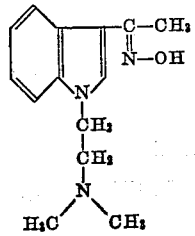

4. 3-butyryl 1-β-dimethylamino-ethyl indol oxime of the formula

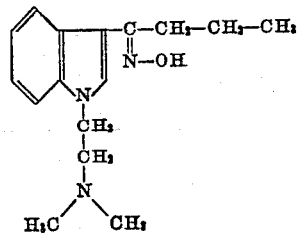

5. 3-propionyl 1-γ-dimethylamino-propyl indol oxime of the formula

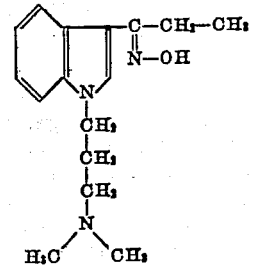

6. 3-propionyl 1-β-methyl-β-dimethylamino-ethyl indol oxime of the formula

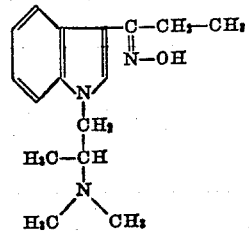

References Cited in the file of this patent
UNITED STATES PATENTS

| | | |
|---|---|---|
| 2,528,940 | Wright | Nov. 7, 1950 |
| 2,616,896 | Weisblat et al. | Nov. 4, 1952 |
| 2,687,414 | Cusic | Aug. 24, 1954 |

FOREIGN PATENTS

| | | |
|---|---|---|
| 720,298 | Great Britain | Dec. 15, 1954 |

OTHER REFERENCES

Buu-Hoi et al.: Jour. Org. Chem., vol. 16, pp. 1198–1200 (1951).

Mann et al.: Jour. Chem. Soc. (London), pp. 670–671 (1944).